ated Sept. 3, 1974

3,833,631
ALUMINUM SALTS OF ESTERS AS STABILIZING AGENTS FOR CHLORINATED VINYL POLYMERS
Gabriella Balint nee Berczi, Lajos Csonka, Gyorgy Galambos, Pal Gomory, Tibor Kelen, Ferenc Nagy, Janos Szerecz, and Ferenc Tudos, Budapest, Hungary, assignors to Intercooperation Kereskedelemfejlesztesi Rt., Budapest, Hungary
No Drawing. Filed Mar. 27, 1972, Ser. No. 238,468
Claims priority, application Hungary, Apr. 1, 1971, MA 2,217
Int. Cl. C07f 5/06
U.S. Cl. 260—448 R                3 Claims

ABSTRACT OF THE DISCLOSURE

Compounds of the formula

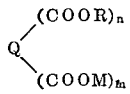

wherein

Q is a member selected from the group consisting of aryl, saturated straight-chained or branched hydrocarbon of 2 to 20 carbon atoms and unsaturated straight-chained or branched hydrocarbon of 3 to 20 carbon atoms,
R is a member selected from the group consisting of aryl and saturated straight-chained or branched aliphatic hydrocarbon of 2 to 20 carbon atoms, and R may be substituted with at least one hydroxy,
M is one equivalent of aluminum,
$n$ and $m$ each represent an integer of 1 to 3, and the sum of $n+m$ is at least two and not more than four, but if Q is phenyl, $n$ may not represent 1.
have been prepared by reacting the alkali metal salts of the appropriate partial esters with compounds supplying aluminum.

The compounds of the general formula I exert excellent stabilizing effect on chlorinated vinyl polymers. The stabilizers may be added to the polymers in an amount of 0.1 to 30% by weight, preferably in an amount of 1 to 20% by weight. The novel stabilizers can be used in admixture with conventional stabilizers as well.

---

This invention relates to novel stabilizing agents and a process for the preparation thereof. This invention relates further to a method of stabilizing chlorine-containing vinyl polymers, as well as to the stabilized polymers.

The novel stabilizers according to the invention correspond to the formula

     (I)

wherein

Q is a member selected from the group consisting of aryl, saturated straight-chained or branched hydrocarbon of 2 to 20 carbon atoms and unsaturated straight-chained or branched hydrocarbon of 3 to 20 carbon atoms,
R is a member selected from the group consisting of aryl and saturated straight-chained or branched aliphatic hydrocarbon of 2 to 20 carbon atoms, and R may be substituted with at least one hydroxy,
M is one equivalent of aluminum, $n$ and $m$ each represent an integer of 1 to 3, and the sum of $n+m$ is at least two and not more than four, but if Q is phenyl, $n$ may not represent 1.

The compounds of the general formula I exert a high stabilizing effect on chlorinated vinyl polymers.

Up to now the following types of compounds have been used for the stabilizing of chlorinated vinyl polymers: alkaline or neutral salts of lead, barium, cadmium and zinc formed with organic or mineral acids (e.g. alkaline lead sulfate, lead phthalate, barium stearate etc.), metalorganic compounds (e.g. dibutyltin dilaurate, metalorganic mercaptides etc.), epoxidized oils, and organic compounds of the trivalent phosphorous (e.g. triphenyl phosphite etc.). Such compounds were described e.g. in the following literatures: F. Chevassus, R. de Broutelles: La stabilisation des chlorures de polyvinyle, Ed. Amphora, Paris, 1957, p. 93 to 116; M. B. Neiman: Starenie i stabilizatia polymerov, Issd. Nauka, Moscow, 1964, p. 172 to 184; J. Voigt: Die Stabilisierung der Kunststoffe gegen Licht und Wärme, Springer Verlag Berlin-Heidelberg-New York, 1966, p. 236 to 388; K. Thinius: Stabilisierung und Alterung von Plastwerkstoffen, Vol. I., Akad. Verlag Berlin, 1969, p. 224 to 613.

One of the most important requirements raised against the stabilizing agents is that they should be dispersed in the chlorinated vinyl polymer completely homogeneously, and possibly in molecular dimensions. From this point of view the inorganic salts (sulfates, silicates etc.) of lead, which have otherwise an excellent stabilizing effect, are very disadvantageous, since these compounds are powdery solids, accordingly their stabilizing effect appears only on the phase limits. Further disadvantages arise from the great polarity differences between the powdery stabilizers and the chlorinated vinyl polymers. That is the reason why powdery stabilizers cannot be completely dispersed in the polymers even if high energies are used, since at the preparation of a homogeneous dispersion in molecular dimensions the chlorine-containing vinyl polymers suffer mechanical and thermal degradation. The products prepared using such powdery stabilizers are not transparent, and, due to the inhomogeneous distribution of the stabilizing agent, the electric breakdown resistance of thin polymer layers does not meet the requirements.

In order to avoid the above disadvantages, several authors have suggested the use of metalorganic substances, which can easily be dispersed in the polymers even in molecular dimensions. These substances have high stabilizing effect, a great number of them, however, is extremely toxic, accordingly the polymers containing such stabilizers cannot be used e.g. for the packing of foodstuffs or for the preparation of consumption goods. The less toxic substances have the disadvantage that their manufacturing costs are extremely high (see e.g. J. Voigt: Die Stabilisierung der Kunststoffe gegen Licht und Wärme, Springer Verlag Berlin-Heidelberg-New York, 1966, p. 432 to 439; K. Thinius: Stabilisierung und Alterung von Plastwerkstoffen, Vol. I., Akad. Verlag Berlin, 1969, p. 689 to 705).

The stabilizing capacity of epoxy-type stabilizers is generally not sufficient due to the nature of the oxirane ring and to the limited compatibility of such compounds. Accordingly the epoxy-type stabilizers are generally used in combination with other stabilizing agents (see e.g. K. Thinius: Stabilisierung und Alterung von Plastwerkstoffen, Vol. I., Akad. Verlag Berlin, 1969, p. 248 to 266).

Now we have found that the disadvantages mentioned above can be avoided when the substances of the general formula I are used as stabilizing agents. These novel compounds exert a high stabilizing effect and can easily be dispersed in the chlorinated vinyl polymers in molecular dimensions with low energy consumption. A further advantage of these novel compounds is that their toxicity is low (e.g. the aluminum compounds are practically non-toxic). Moreover, we have found, quite unexpectedly, that these new compounds considerably increase the stabilizing capacity of known stabilizers, accordingly they can advantageously be used for stabilizing purposes in admixture with such conventional stabilizing agents.

The new compounds of the general formula I can easily and economically be prepared by reacting the compounds of the general formula II

(II)

wherein Q, R, $m$ and $n$ have the same meanings as defined above and X represents a potassium or sodium atom—with compounds supplying aluminum ions in an aqueous medium.

The starting compounds of the general formula II can be prepared according to known methods of salt-forming. For the preparation of the alkali metal salts of the partial esters, impure esters of technical quality may be used as well.

The reaction is carried out by simply mixing the reactants in an aqueous solution. After some minutes the novel partial esters of the general formula I separate from the solution and can be recovered by conventional methods, e.g. by filtration or centrifugation. The separated products are dried. By the proper selection of the metal compounds the formation of water-insoluble impurities can be avoided. As aluminium compound preferably the corresponding sulfate, nitrate or chloride is used. Tin is used preferably in the form of its chloride, while among the lead compounds the nitrate and the acetate proved to be the most preferred ones.

When stabilizing chlorinated vinyl polymers, the compounds of the general formula I are added to the polymers in an amount of 0.1 to 30% by weight, preferably of 1 to 20% by weight, optionally together with other stabilizers, such as stearates and epoxidized compounds. The polymer may also contain two or more of the stabilizing agents of the general formula I.

The mixture of the polymer and the stabilizer(s) is thoroughly homogenized and processed according to known techniques.

The molecular dimensions of the novel stabilizers of the general formula I may be several times higher than those of the conventional ones, accordingly they are far less liable to migration than the known substances. The ester side-chains present in the molecules of the stabilizers exert a softening (and even lubricating) effect to a certain extent, therefore in order to attain the same plasticity, lower amounts of conventional plasticizers are to be added to the polymers. It is a further advantage that the favourable polarity sequence of the novel stabilizer molecules exerts a retention effect on the less expensible plasticizers which are liable to migration, accordingly the costs of preparation can be further reduced.

Using the stabilizers of the general formula I, a good stabilizing effect can be achieved by incorporating far lower amounts of metal than in the case of the conventional pigment-like stabilizers. A particular advantage is that the non-toxic aluminum derivatives are able to ensure the stability required at the processing without any further additives.

In order to meet special demands, the capacity of the stabilizers can be increased by introducing hydrogen chloride acceptor moieties (e.g. carbon to carbon double or triple bonds) into the molecule.

The novel stabilizers of the general formula I can be prepared easily and with low costs. The reactions proceed practically with quantitative yields.

In order to characterize the stabilizing effect of the stabilizers according to the invention, comparative tests were carried out between the widely used dibutyltin dilaurate and lead salt of monoisooctyl maleate of excellent stabilizing effect and some of the new stabilizers of the invention. The stabilizers were added to the vinyl chloride polymer under investigation in amounts of 6 and 15% by weight. The results of these tests are listed in Table 1.

The data of the table are related to polymers containing no stabilizer.

TABLE 1

| | Without stabilizer | DBTL 6% | PbiOM 6% | PbiOM 15% | PbOP 6% | PbOP 15% | AlOP 6% | AlOP 15% |
|---|---|---|---|---|---|---|---|---|
| A | 1.00 | 3.20 | 3.80 | 9.20 | 3.00 | 7.00 | 3.20 | 5.00 |
| B | 1.00 | 1.52 | 1.26 | 1.37 | 1.65 | 1.90 | 1.00 | 0.45 |
| C | 1.00 | 0.93 | 0.82 | 0.29 | 0.47 | 0.08 | 0.71 | 0.44 |
| D | 1.00 | 1.00 | 0.84 | 0.38 | 0.36 | 0.04 | 0.68 | 0.38 |
| $q = \dfrac{A}{B \times D}$ | 1.00 | 2.10 | 3.59 | 17.67 | 5.05 | 92.11 | 4.71 | 29.24 |

NOTE:
DBTL = dibutyltin dilaurate.
PbiOM = lead salt of monoisooctyl maleate.
PbOP = lead salt of monooctyl phthalate.
AlOP = aluminum salt of monooctyl phthalate.
A = induction period of HCl development at 200° C.
B = rate of HCl development after the induction period at 200° C.
C = total amount of polyenes after 90 min. at 200° C.
D = amount of polyenes causing discolourization after 90 min. at 200° C.
$q$ = a numerical factor characterizing the efficiency of the stabilizer (this factor is directly proportional with the duration of the induction period and inversely proportional with the rate of polymer degradation after the induction period and the extent of discolourization).

From the data of the above table it appears that all the stabilizers of the general formula I have more favourable characteristics and higher stabilizing effect than dibutyltin laurate and the other known partial ester-type stabilizers. It is particularly striking that the aluminum salt of monooctyl phthalate decreases the degradation rate of the polymer even after the induction period, contrary to any of the other stabilizers under investigation. The lead salt of monooctyl phthalate exerts a surprisingly high inhibition effect against discolourization.

This invention is further elucidated in the following non-limiting Examples.

EXAMPLE 1

A mixture of 130 parts by weight of octanol and 148 parts by weight of phthalic anhydride is heated to 60° C. under inert gas atmosphere in a stainless steel vessel equipped with a stirrer, and when the melting of the solids is complete, the stirrer is put into motion. Exothermic reaction sets in. The reaction is conducted at a temperature below 100° C., and, if necessary, the mixture is heated. After 3 hours of reaction a homogeneous, transparent liquid product is obtained. This product is cooled to a temperature not exceeding 40° C. and passed continuously into a stainless steel vessel equipped with a stirrer. Simultaneously a 20% aqueous sodium hydroxide solution is introduced into this vessel at a rate that the stirred mixture should always give an alkaline reaction. In this way sodium salt of monooctyl phthalate is prepared.

The thus-obtained solution of the sodium salt of monooctyl phthalate is added, under stirring, to the aqueous solution of 170 parts by weight of crystalline lead nitrate. The tixotropic reaction mixture is filtered, the filter cake is washed with water and dried. Lead salt of monooctyl phthalate is obtained in the form of a white, powdery substance. Yield: 94%.

The thus-obtained stabilizer is used in the following formulation:

100 parts by weight of powdery PVC (K–60)
50 parts by weight of dioctyl phthalate
2 parts by weight of lead salt of monooctyl phthalate
0.5 part by weight of stearic acid The mixture is homogenized on roll pairs heated to 160° C., and the obtained transparent product (thickness: about 2 mm.) is subjected to a temperature of 180° C. for 50 minutes. The discolourization of the product is negligible.

On the other hand, if the plates are prepared as described above, but the lead salt of monooctyl phthalate is replaced by alkaline lead stearate, the product becomes yellowish brown after 50 minutes at 180° C.

EXAMPLE 2

Monooctyl phthalate and monolauryl maleate are prepared as described in Example 1. An aqueous solution containing 278 parts by weight of monooctyl phthalate and 568 parts by weight of monolauryl maleate is neutralized with sodium hydroxide as described in Example 1, and 175 parts by weight of aluminum sulfate are added, in the form of aqueous solution, to the obtained salt mixture. The separated substance is filtered off, washed with water and dried. Aluminum salt of monooctyl phthalate and monolauryl maleate is obtained. The substance is liquid at a temperature above 100° C. When cooled to room temperature, a gummy product is formed, which transforms into a brittle solid after some days of standing. Yield: 91%.

A PVC composition containing 5 parts by weight of the above stabilizer is prepared as described in Example 1. The obtained product is transparent and has an excellent stability (no discolouring occurs after 50 minutes at 180° C.).

EXAMPLE 3

A mixture of 282 parts by weight of oleic acid and 98 parts by weight of maleic anhydride is heated to 40° C. under inert gas atmosphere, then the molten reaction mixture is heated to 180–200° C. under stirring. After 4 hours of reaction the mixture is cooled again to 40° C., 37 parts by weight of butanol and 65 parts by weight of octanol are added, and the mixture is kept at 100° C. for 3 hours. The obtained mixture is neutralized with sodium hydroxide, and the neutral solution is added to the aqueous solution of 175 parts by weight of aluminum sulfate and 230 parts by weight of crystalline tin dichloride. The separated product is filtered off, washed with water and dried. The partial ester salt is obtained with a yield of 86%.

A PVC composition containing 3 parts by weight of the aluminum-tin stabilizer obtained in the above process is prepared as described in Example 1. A transparent, stable product is obtained (only a negligible discolourization occurs after 60 minutes at 180° C.).

EXAMPLE 4

192 parts by weight of trimellitic acid and 130 parts by weight of octanol are reacted as described in Example 1 to form the monooctyl ester of trimellitic acid. The solution of the ester is neutralized with sodium hydroxide, and the obtained aqueous solution is added, under stirring, to the aqueous solution of 165 parts by weight of crystalline lead nitrate and 220 parts by weight of aluminum nitrate. The separated product is filtered off, washed with water and dried. The lead-aluminum stabilizer is obtained with a yield of 92%.

A PVC composition containing 4 parts by weight of the above lead-aluminum stabilizer is prepared as described in Example 1. The obtained substance possesses a good stability (only a slight yellowish colour can be observed after 50 minutes at 180° C.).

EXAMPLE 5

A mixture of 218 parts by weight of pyromellitic acid dianhydride, 74 parts by weight of butanol and 206 parts by weight of laurylalcohol is reacted at 100° C. for 3 hours. The obtained transparent liquid is neutralized with aqueous sodium hydroxide solution, and the obtained solution is added, under stirring, to the aqueous solution of 335 parts by weight of crystalline lead nitrate. The separated product is filtered off, washed with water and dried. The stabilizer is obtained with a yield of 93.5%.

A PVC composition containing 3 parts by weight of the above stabilizer is prepared as described in Example 1. The stability of the obtained product is excellent (no discolourization occurs after 80 minutes at 180° C.).

EXAMPLE 6

A mixture of 100 parts by weight of PVC (K–60), 0.5 parts by weight of stearic acid, 2 parts by weight of calcium stearate, 2 parts by weight of zinc octoate, 0.2 parts by weight of aluminum salt of monooctyl phthalate (prepared as described in Example 1) and 4 parts by weight of epoxidized soybean oil is homogenized on roll pairs at a temperature of 170° C., thereafter the obtained mixture is subjected to mechanical and thermal treatment for 45 minutes on the roll pairs at 170° C. A yellowish product is obtained.

When a mixture of the same composition but containing no aluminum salt of monooctyl phthalate is subjected to the above treatment, a reddish-brown coloured product is obtained.

EXAMPLE 7

0.5 parts by weight of stearic acid, 2 parts by weight of lead phthalate and 0.25 parts by weight of an aluminum salt of monooctyl phthalate and monooctyl laurate (prepared as described in Example 2) are added to 100 parts by weight of a vinylchloride-vinylacetate copolymer (vinylacetate content: 10% by weight). The mixture is homogenized on roll pairs at a temperature of 170° C., thereafter the obtained mixture is subjected to mechanical and thermal treatment for 45 minutes on the roll pairs at 170° C. A light yellowish product is obtained.

When a mixture of the same composition as described above but containing no aluminum salt stabilizer is subjected to the above treatment, a brown coloured product is obtained.

What we claim is:

1. Aluminum salt of pyromellitic acid monobutyl monolauryl ester.
2. Aluminum salt of trimellitic acid monooctyl ester.
3. Aluminum salt of monooctyl succinate.

References Cited

UNITED STATES PATENTS

| | | | |
|---|---|---|---|
| 1,742,506 | 1/1930 | Henning et al. | 260—429.7 X |
| 2,087,999 | 7/1937 | Salzberg | 260—448 R X |
| 3,244,737 | 4/1966 | Horan et al. | 260—435 R X |
| 3,245,948 | 4/1966 | Hendricks et al. | 260—435 R X |
| 3,354,191 | 11/1967 | Stivers | 260—448 R |
| 3,485,858 | 12/1969 | Gee et al. | 260—448 R |
| 3,496,106 | 2/1970 | Matson | 252—32.7 R |
| 3,632,510 | 1/1972 | Le Suer | 260—435 R X |

OTHER REFERENCES

Chemical Abstracts, Vol. 71, 92256e (1969).
Chemical Abstracts, Vol. 66, 38402b (1967).

HELEN S. SNEED, Primary Examiner

U.S. Cl. X.R.

260—45.75, 429.7, 435 R